United States Patent
Koshimizu et al.

(10) Patent No.: US 7,222,169 B2
(45) Date of Patent: May 22, 2007

(54) CONTROL METHOD AND SYSTEM FOR INFORMATION DELIVERY THROUGH MOBILE COMMUNICATIONS NETWORK

(75) Inventors: Takashi Koshimizu, Yokosuka (JP); Koji Sasada, Kamakura (JP)

(73) Assignee: NTT DoCoMo, Inc., Tokyo (JP)

( * ) Notice: Subject to any disclaimer, the term of this patent is extended or adjusted under 35 U.S.C. 154(b) by 669 days.

(21) Appl. No.: 10/043,200

(22) Filed: Jan. 14, 2002

(65) Prior Publication Data

US 2002/0094813 A1 Jul. 18, 2002

(30) Foreign Application Priority Data

Jan. 15, 2001 (JP) ............................ 2001-006641

(51) Int. Cl.
*G06F 13/00* (2006.01)
(52) U.S. Cl. ................ 709/224; 709/218; 709/238
(58) Field of Classification Search ................ 709/203, 709/217, 219, 223, 225, 226, 224, 238, 218
See application file for complete search history.

(56) References Cited

U.S. PATENT DOCUMENTS

| | | | |
|---|---|---|---|
| 5,924,116 A | | 7/1999 | Aggarwal et al. |
| 6,263,402 B1* | | 7/2001 | Ronstrom et al. .......... 711/131 |
| 6,377,805 B1* | | 4/2002 | Anvekar et al. ............ 455/436 |
| 6,829,654 B1* | | 12/2004 | Jungck ...................... 709/246 |
| 6,874,017 B1* | | 3/2005 | Inoue et al. ................ 709/217 |
| 6,901,437 B1* | | 5/2005 | Li .............................. 709/219 |
| 2001/0002900 A1* | | 6/2001 | Romrell ...................... 370/216 |
| 2001/0003194 A1* | | 6/2001 | Shimura et al. ........... 709/310 |
| 2002/0101848 A1* | | 8/2002 | Lee et al. .................... 370/349 |
| 2002/0116444 A1* | | 8/2002 | Chaudhri et al. .......... 709/201 |

FOREIGN PATENT DOCUMENTS

| | | |
|---|---|---|
| EP | 1 039 721 | 9/2000 |
| JP | 11-163947 | 6/1999 |
| JP | 2000-201145 | 7/2000 |

OTHER PUBLICATIONS

S. Hadjiefthymiades, et al., Vehicular Technology Conference, pp. 1755-1759, XP-010353269, "A Resource Management Scheme for Efficient WWW Computing in Wireless Communications", 1999.

* cited by examiner

*Primary Examiner*—Viet D. Vu
(74) *Attorney, Agent, or Firm*—Oblon, Spivak, McClelland, Maier & Neustadt, P.C.

(57) ABSTRACT

A control method and system for information delivery in a mobile communications network in which, as a mobile terminal moves from a communication area to another, a cache node in a delivery channel which delivers cache information to the mobile terminal is switched to another cache node in another delivery channel to reduce information traffic in the network utilizing the cache function of the cache nodes. After a portion of cache information is delivered by a cache node to the mobile terminal, only the remaining portion of cache information is delivered by another cache node.

8 Claims, 6 Drawing Sheets

| CACHE INFORMATION | STORED PORTION |
|---|---|
| D' | d1 |
| ⋮ | ⋮ |

FIG.5B

| CACHE INFORMATION | STORED PORTION |
|---|---|
| D' | d2,d3 |
| ⋮ | ⋮ |

FIG.5C

| CACHE INFORMATION | STORED PORTION |
|---|---|
| D' | d4,d5 |
| ⋮ | ⋮ |

FIG. 6

CONTROL METHOD AND SYSTEM FOR INFORMATION DELIVERY THROUGH MOBILE COMMUNICATIONS NETWORK

BACKGROUND OF THE INVENTION

1. Field of the Invention

The present invention relates to a control method and a control system for delivering information to mobile terminal through mobile communication network. The present invention further relates to an information storage method which is performed at each node in the mobile communication network where information is delivered in accordance with the control method.

2. Description of the Related Art

A control method for delivering information using the cache function of the fixed communication network is defined in the standards, RFC2186 (Internet Cache Protocol, Version 2) and RFC2187 (Application of Internet Cache Protocol, Version 2). In the mobile communication network where the control method for delivering information complying with the standards, the existence of a cache node along the route through which data is transferred is checked before a mobile terminal downloads the data. If a cache node exists in the delivery channel, the information delivery is performed through the cache node.

Figure 1:
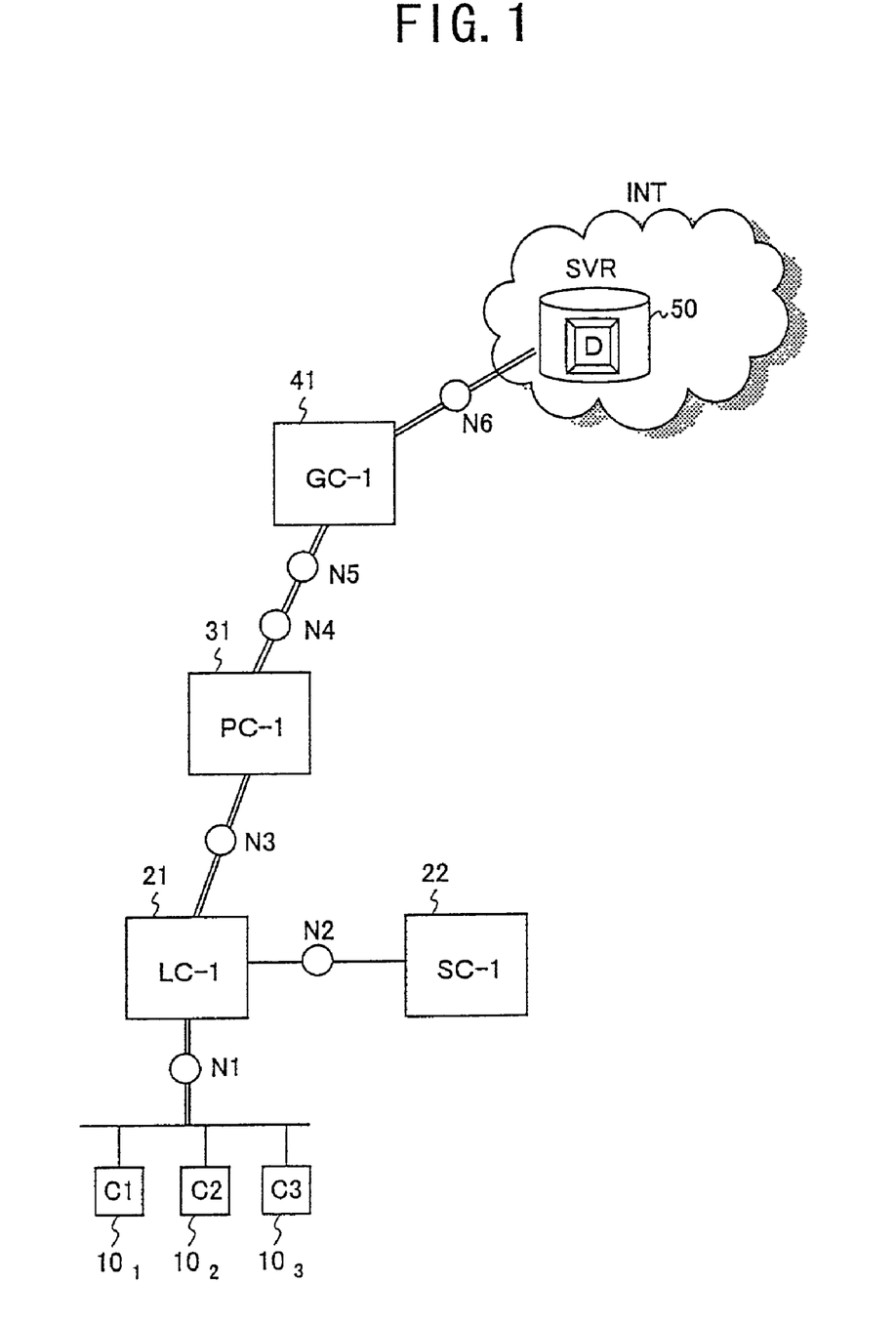
FIG. 1 is a schematic drawing showing a conventional fixed communication network system in which information delivery is controlled in accordance with the Internet Cache Protocol.

A communication system in which the information delivery is performed in compliance with the control method for delivering information to fixed terminals are configured as shown in FIG. 1, for example. The Internet Cache Protocol is utilized as the control method for delivering information.

In FIG. 1, the communication network includes communication nodes N1–N6 each functioning as a router and communication nodes 21, 22, 31, and 41 each functioning as a router and a cache (hereinafter referred to as "cache nodes"). The local cache node 21 (LC-1) is connected to the parent cache node 31 (PC-1) through the communication node N3 and the subsidiary cache node 22 (SC-1) through the communication node N2. The parent cache node 31 is connected to the grand parent cache node 41 (GC-1) through the communication nodes N4 and N5. The grand parent cache node 41 is connected to the internet INT where a host server 50 (SVR) exists, through the communication node N6.

Client terminals $10_1$(C1), $10_2$(C2), $10_3$(C3) are connected to the local cache node 21 through the communication node N1. They receive information delivery service from the communication network where the local cache node 21, the parent cache node 31, and the grand parent cache node 41 each having a cache function are arranged in a hierarchy.

In the network system described above, information "D" stored in the host server SVR is transferred to the client terminal $10_1$(C1), for example, in the following manner.

A request for delivery of the information D sent by the client terminal $10_1$ is transferred to the local cache node 21 through the communication node N1. The local cache node 21 checks whether it stores the information D, and if it does not store the information D, it transfers the request for delivery toward the communication node N3. In response to the reception of the request for the delivery, the parent cache node 31 checks whether it stores the information D, and if it does not store the information D, it further transfers the request for delivery toward the communication node N4. The request for delivery is transferred to the grand parent node 41 through the communication nodes N4 and N5. As described above, if no cache node stores the information D which is requested by the client 10, the request for delivery is transferred to the communication nodes (including cache nodes) sequentially.

The request for delivery of the information D is finally transferred to the host server 50 in the internet INT. The host server 50 delivers the information D toward the client terminal $10_1$ through the internet INT. The information D delivered by the host server 50 is delivered to the client terminal $10_1$ through each communication nodes (including cache nodes).

Figure 2:
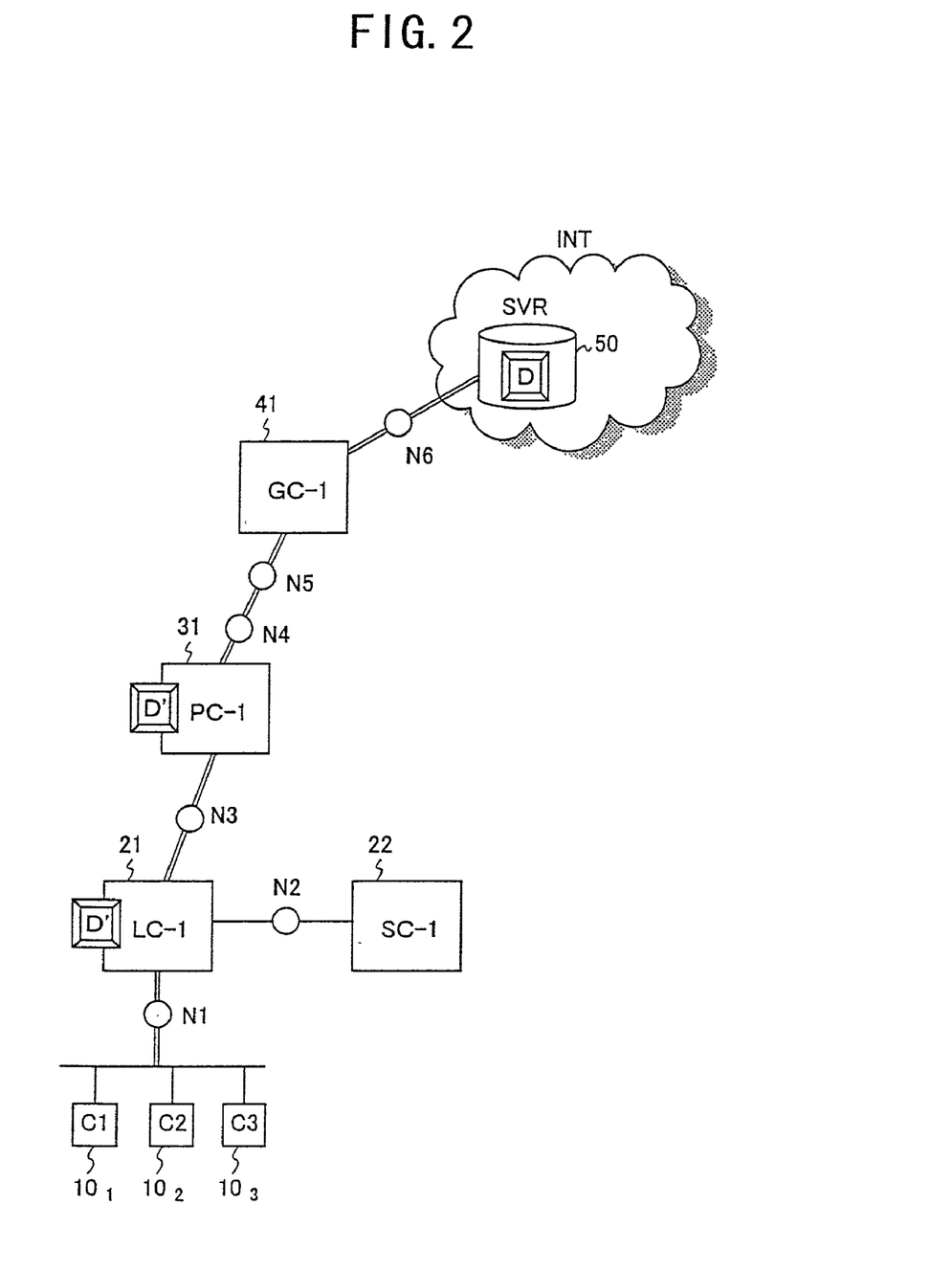
FIG. 2 is a schematic drawing showing cache information stored in each node in the conventional fixed communication network system shown in FIG. 1.

As shown in FIG. 2, in the process in which the information D is delivered from the host server 50 to the client terminal $10_1$, the cache nodes, the local cache node 21 and the parent cache node 31 for example, near the client terminal $10_1$ stores (or caches) cache information D' identical to the information D.

If one of the client terminals $10_1$, $10_2$, $10_3$ issues another request for delivery of the information D, the cache information D' corresponding to the information D stored in the local cache node 21 is delivered to the client terminal requested for the delivery. Accordingly, the traffic within the communication network is reduced.

Mobile terminals, however, move while receiving the delivery of information, that is, downloading data. Therefore, it is necessary to switch delivery channel while receiving information. Since the switching of the communication channel degrades the efficiency of information delivery, it is not practical to apply the abovementioned method for delivering information complying with the Internet Cache Protocol designed for the fixed communication network to the mobile communication network. For example, while receiving the delivery of cache information from a cache node in the mobile communication network, a mobile terminal, as it moves, switches its connection to cache nodes. That is, the delivery channel between the mobile terminal and the host server is switched. If a new delivery channel does not include a cache node which stores cache information, the cache function of the cache nodes do not work effectively.

SUMMARY OF THE INVENTION

Accordingly, it is the first object of the present invention to provide a novel and useful control method and control system for delivery information in which information is efficiently delivered to mobile terminals through the mobile communication network.

The second object of the present invention is to provide an information storage method for communication nodes in the mobile communication network to which the control method for delivering information is applied.

In order to achieve the above objects according to the present invention, a control method for information delivery for a mobile communications network including a plurality of communication nodes, includes a step of identifying a first cache node storing cache information in a first delivery channel established in response to a delivery request for original information from a mobile terminal staying in a first communication area, wherein said cache information is identical to said original information, a step of identifying a second cache node storing cache information in a second delivery channel while said mobile terminal is receiving said cache information from said first cache node through said first delivery channel, a step of sending by said first cache node to said second cache node a first signal indicating that a portion of said cache information has been delivered to said mobile terminal by said first cache node, and a step of delivering said cache information except for said portion of said cache information in response to said first signal from said second cache node to said mobile terminal in a second communication area.

In the control method for information delivery, as the mobile terminal which receives the cache information from the first cache node through the first delivery channel moves, when the first delivery channel is switched to the second delivery channel, the second cache node storing the cache information in a second delivery channel delivers the remaining portion of the cache information to the mobile terminal through the second delivery channel.

In order to realize a continuous efficient delivery of the cache information, the present invention is characterized by the control method described above, further including a step of informing, by said first cache node, a third cache node that said portion of said cache information has been delivered to said mobile terminal, and a step of informing, by said third cache node, a second cache node that said portion of said cache information has been delivered to said mobile terminal through said first delivery channel, wherein said third cache node is included in both said first delivery channel and said second delivery channel.

The present invention further includes the control method described above, wherein the second delivery channel is established, and the second cache node in the second delivery channel is identified when the mobile terminal performs a hand-over to another wireless communication node while the mobile terminal receives the cache information from the first cache node through the first delivery channel.

To achieve the first object, the present invention further includes a control system for information delivery for a mobile communications network including a plurality of communication nodes, including means for identifying a first cache node storing cache information in a first delivery channel established in response to a delivery request for original information from a mobile terminal staying in a first communication area, wherein said cache information is identical to said original information, means for identifying a second cache node storing cache information in a second delivery channel while said mobile terminal is receiving said cache information from said first cache node through said first delivery channel, means for sending to said second cache node a first signal indicating that a portion of said cache information has been delivered to said mobile terminal by said first cache node, and means for delivering said cache information except for said portion of said cache information in response to said first signal from said second cache node to said mobile terminal in said second communication area.

Furthermore, to achieve the second object, the present invention includes an information storage method for a first cache node in a mobile communications network in which a mobile terminal receives information through a plurality of delivery channels while said mobile terminal moves from a communication area to another, wherein a portion of said information which is transferred through said first cache node is stored in said communication node.

In this information storage method, in the process that the cache information is delivered to the mobile terminal, portions of the cache information are stored in each communication node in the mobile communications network. If another mobile terminal requests for the delivery of the information under the circumstances where the portions of the cache information are stored in each communication node, the portions of the cache information are to be delivered from each communication node to the mobile terminal.

The present invention is further configured to an information storage method described above in which said first cache node manages said portion of said information using a stored data control table indicating the title of said information and the identification information of said portion of said information.

The present invention is also configured to an information storage method described above in which, if said first cache node storing said portion of said cache information therein is included in a delivery channel which is established in response to an information delivery request, said first cache node delivers said portion of said cache information to said mobile terminal.

In a mobile communications network utilizing this control method for information delivery, a portion of the information relative to the information delivery request from the mobile terminal is delivered from the first cache node to the mobile terminal. Accordingly the volume of information transferred through the delivery channel in the mobile communications network can be reduced.

The present invention is yet further configured to a control method of information delivery as described above in which, if a second cache node is included in the delivery channel established as described above, the first cache node informs the second cache node that the first cache node finishes delivering the portion of the cache information, and the second cache node delivers the remaining portion of the cache information, except for the portion already delivered by the first cache node, to the mobile terminal through the delivery channel in order to deliver the requested information to the mobile terminal more efficiently.

Furthermore, the present invention is configured to a control system for information delivery described above which controls the information delivery to the mobile terminal through a mobile communications network including cache nodes storing portions of the information in accordance with the abovementioned control method for information delivery, if the first cache node storing the portion of the cache information relative to the information delivery request is included in the delivery channel established in response to the information delivery request, the first cache node delivers the portion relative to the information delivery request to the mobile terminal.

Other objects, features, and advantages of the present invention will be more apparent from the following detailed description when read in conjunction with the accompanying drawings.

DETAILED DESCRIPTION OF THE PREFERRED EMBODIMENTS

Figure 3:
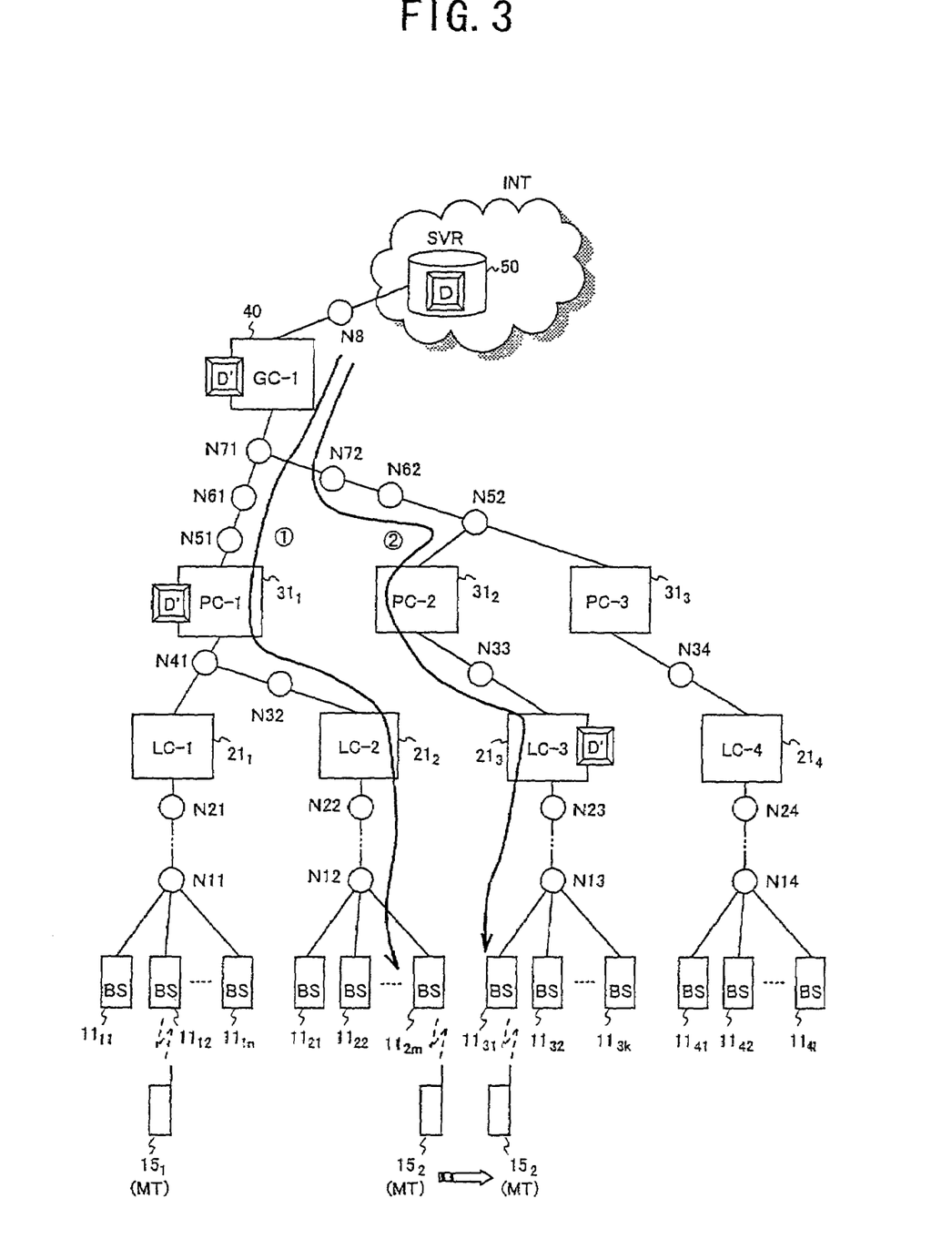
FIG. 3 is a schematic drawing showing a configuration of a mobile communication system in which information delivery is controlled by the control method relative to an embodiment of the present invention.

FIG. 3 shows a system in which information is delivered in accordance with the control method for delivering information relative to an embodiment of the present invention.

In FIG. 3, a mobile communication network includes local cache nodes $21_1$, $21_2$, $21_3$, $21_4$, parent cache nodes $31_1$, $31_2$, $31_3$, and grand parent cache node 40, each operating as a router and an information storage device. The local cache node $21_1$ is connected to the parent cache node $31_1$ through a communication node N41. The local cache node $21_2$ is connected to the parent cache node $31_1$ through communication nodes N32 and N41. The local cache node $21_3$ is connected to the parent cache node $31_2$ through a communication node N33. The local cache node $21_4$ is connected to the parent cache node $31_3$ through a communication node N34.

The parent cache node $31_1$ is further connected to a communication node N71 through communication nodes N51 and N61. Each of the parent cache nodes $31_2$ and $31_3$ is connected to a communication node N52. The communication node N52 is connected to the communication node N71 through communication nodes N62 and N72. The communication node N71 is further connected to the grand parent cache node 40. The grand parent cache node 40 is connected to the internet including a host server 50 through a communication node N8.

A plurality of wireless base stations $11_{11}$, $11_{12}$, ..., $11_{1n}$ (BS) is connected to the local cache node $21_1$ through communication nodes N11 and N21. A mobile terminal $15_1$ (MT) receives the delivery of information (packets) through the mobile communication network described above by wireless communicating with one of the wireless base stations.

The host server 50 in the internet INT stores information D. It is assumed that the grand parent cache node 40, the parent cache node $31_1$, and the local cache node $21_3$ in the mobile communication network have already stored cache information D'.

When the mobile terminal $15_2$ is turned on, while staying in the communication area of the wireless base station $11_{2m}$, or enters the communication area of the wireless base station $11_{2m}$, the wireless base station $11_{2m}$, recognizes that the mobile terminal $15_2$ is in its communication area, and establishes a default delivery channel of information for the mobile terminal $15_2$ in the following manner.

In response to the recognition that the mobile terminal $15_2$ is in its communication area, the wireless base station $11_{2m}$ issues a registration request of the mobile terminal $15_2$ together with, for example, its own identification such as its IP address toward the communication node N12. The registration request is transferred through the communication nodes N12 and N22, the local cache node $21_2$, the communication nodes N32 and N41, the parent cache node $31_1$, the communication nodes N51, N61, N71, the grand parent node 40, and the communication node N8. During the process of transferring the registration request, each node (including cache nodes) registers itself as a member of the delivery channel for the mobile terminal $15_2$ (entry).

Accordingly, a default delivery channel ① is established for the mobile terminal $15_2$ in the mobile communication network.

When the mobile terminal $15_2$ issues a delivery request for information D toward the wireless base station $11_{2m}$, the wireless base station $11_{2m}$ transfers the request serially through each communication nodes (including cache nodes) in the delivery channel ① described above. In the delivery process, each cache node checks whether it stores cache information D' relative to the information D, in response to the receipt of the delivery request. If the cache node does not store the cache information D', the cache node further transfers the delivery request toward the upper communication nodes. If the cache node determines that it stores the cache information D', it determines that it becomes the delivery source of the cache information D'.

For example, if the local cache node $21_2$ finds, in response to the delivery request, that it does not store the cache information D' relative to the information D, the local cache node $21_2$ transfers the delivery request toward the communication node N32. The parent cache node $31_1$ checks, in response to the receipt of the delivery request, whether it stores cache information D', and if the parent cache node $31_1$ finds that it stores the cache information D' therein, it determines that it becomes the delivery source of the cache information D'.

Accordingly, once the parent cache node $31_1$ determines that it becomes the delivery source of the cache information D', it transfers the cache information D' addressed to the mobile terminal $15_2$ toward the communication node N41. The cache information D' is transferred to the wireless base station $11_{2m}$ which performs wireless communications with the mobile terminal $15_2$ through the communication nodes N41 and N32, the local cache node $21_1$, the communication nodes N41 and N32, the local cache node $21_1$, the communication nodes N21 and N11, and finally delivered from the wireless base station $11_{2m}$ to the mobile terminal $15_2$.

Under such situation, it is further assumed that the mobile terminal $15_2$, while being delivered the cache information D' from the parent cache node $31_1$, moves from the communication area of the wireless base station $11_{2m}$ to the communication area of the wireless base station $11_{31}$.

The mobile terminal $15_2$ sends a hand-over request. In response to the receipt of the hand-over request, the wireless base station 11m transfers the hand-over request toward the communication node N12 next to the wireless base station $11_{2m}$. The hand-over request is further transferred from the communication node N12 through each communication node (including cache nodes) in the delivery channel ①. The parent cache node $31_1$ which is delivering the cache information D' stops the delivery of the cache information D' in response to the receipt of the hand-over request.

The mobile terminal $15_2$ sends the hand-over request with the information which is contained in the cache information D' to identify the original information D to the wireless base station $11_{31}$. In response to the hand-over request, another default delivery channel ② is newly established in the following manner.

The wireless base station $11_{31}$ receives the hand-over request, and record (entry) that it becomes a member of the delivery channel for the mobile terminal $15_2$ after finding that it has no entry of the mobile terminal $15_2$. The wireless base station $11_{31}$ next transfers the hand-over request to the upper node, that is, the communication node N13. The communication node N13 makes the entry of the mobile terminal $15_2$, and further transfers the hand-over request to the upper node, that is the communication node N23. In the same manner, the hand-over request is transferred serially from the communication node N23 through the local cache node $21_3$, the communication node N33, the parent cache node $31_2$, the communication nodes N52, N62, and N72, to the communication node N71. During this process, each communication node records (entry) that it became a member of the delivery channel for the mobile terminal $15_2$. Since the communication node N71, however, has the entry of the mobile terminal $15_2$, it does not transfer the hand-over request to the upper node. The communication node N71 recognizes that it is a common member of both delivery channels before and after the hand-over, that is, the diverging point of the two delivery channels.

When the communication node N71 finds that it is the diverging point of the two delivery channels, sends a control signal for eliminating the entry of the mobile terminal $15_2$ toward the communication node N61 in the delivery channel ①. This control signal is transferred to the wireless base station $11_{2m}$ serially through the communication nodes N61 and N51, the parent cache node $31_1$, the communication nodes N41 and N32, the local cache node $21_2$, the communication nodes N22 and N12. During this process, each communication node eliminates the entry relative to the mobile terminal $15_2$. That is, the delivery channel ① for the mobile terminal $15_2$ is disengaged.

As described above, once each communication node finishes recording the entry relative to the mobile terminal $15_2$, a new delivery channel ② for the mobile communication terminal $15_2$ after the hand-over is established in the mobile communication network.

After the new delivery channel ② is established, a delivery request for the cache information D' issued by the mobile terminal $15_2$ is transferred from the wireless base station $11_{31}$ which received the delivery request from the mobile terminal $15_2$ to the local cache node $21_3$ serially through the communication nodes N13 and N23 in the delivery channel ②. The local cache node $21_3$, in response to the delivery request, checks that it stores the cache information D' therein, then informs the communication node N33 next to the local cache node $21_3$ that the local cache node $21_3$ stores the cache information D', and is the cache node near the mobile terminal $15_2$ which originated the delivery request. The information is transferred from the communication node N33 up to the communication node N71, the diverging point of the old and new delivery channels, through the parent cache server 312 and the communication nodes N52, N62, and N72, serially.

On the other hand, the parent cache node $31_1$ which was the delivery source of the cache information D' before the hand-over sends control information indicating that it stopped the delivery of the cache information D' because of the hand-over to the communication node N51. The information is transferred through the communication nodes N51 and N61 up to the communication node N71. The control information described above further indicates the portion (sequence number) of the cache information D' delivered prior to the hand-over request from the mobile terminal $15_2$ in addition to the information that the transfer of the cache information D' was interrupted by the hand-over.

The communication node N71, in response to the receipt of the above information, transfer the information about the delivered portion of the cache information D' to the local cache node $21_3$, that is, the new delivery source of the cache information D'. The information is transferred to the local cache node $21_3$ through the communication nodes N72, N62, and N52, the parent cache node $31_2$, and the communication node N33.

The local cache node $21_3$, in response to the receipt of the information about the delivered portion of the cache information D', delivers the remaining portion of the cache information D' to the mobile terminal $15_2$. The remaining portion of the cache information D' is transferred through the communication nodes N23 and N13 to the wireless base station $11_{31}$, the destination of the hand-over, in the delivery channel ②. It is further transferred from the wireless base station $11_{31}$ to the mobile terminal $15_2$.

As described above, even if the mobile terminal $15_2$ is handed over to the wireless base station $11_{31}$ during the information delivery, the mobile terminal $15_2$, which is receiving the cache information D' from the parent cache node $31_1$ through the communication nodes N41 and N32, the local cache node $21_1$, the communication node N22 and N12, and the wireless base station $11_{2m}$ in the delivery channel ①, can continuously receive the remaining portion of the cache information, after the hand-over without issuing another delivery request for the information D. Accordingly, the information delivery control in the mobile communication network realizes efficient information delivery with utilizing the cache function of the communication nodes, and reduces information traffic within the mobile communication network.

In the embodiment described above, it is assumed that communication nodes (including cache nodes) in the mobile communication network are connected in a hierarchy (at least logically), but the control method for delivering information is also applicable to a mobile communication network in which communication nodes are connected in a different manner such as meshed configuration.

In the mobile communication network in which information delivery is controlled as described above, each cache node stores information in the following manner.

Figure 4:
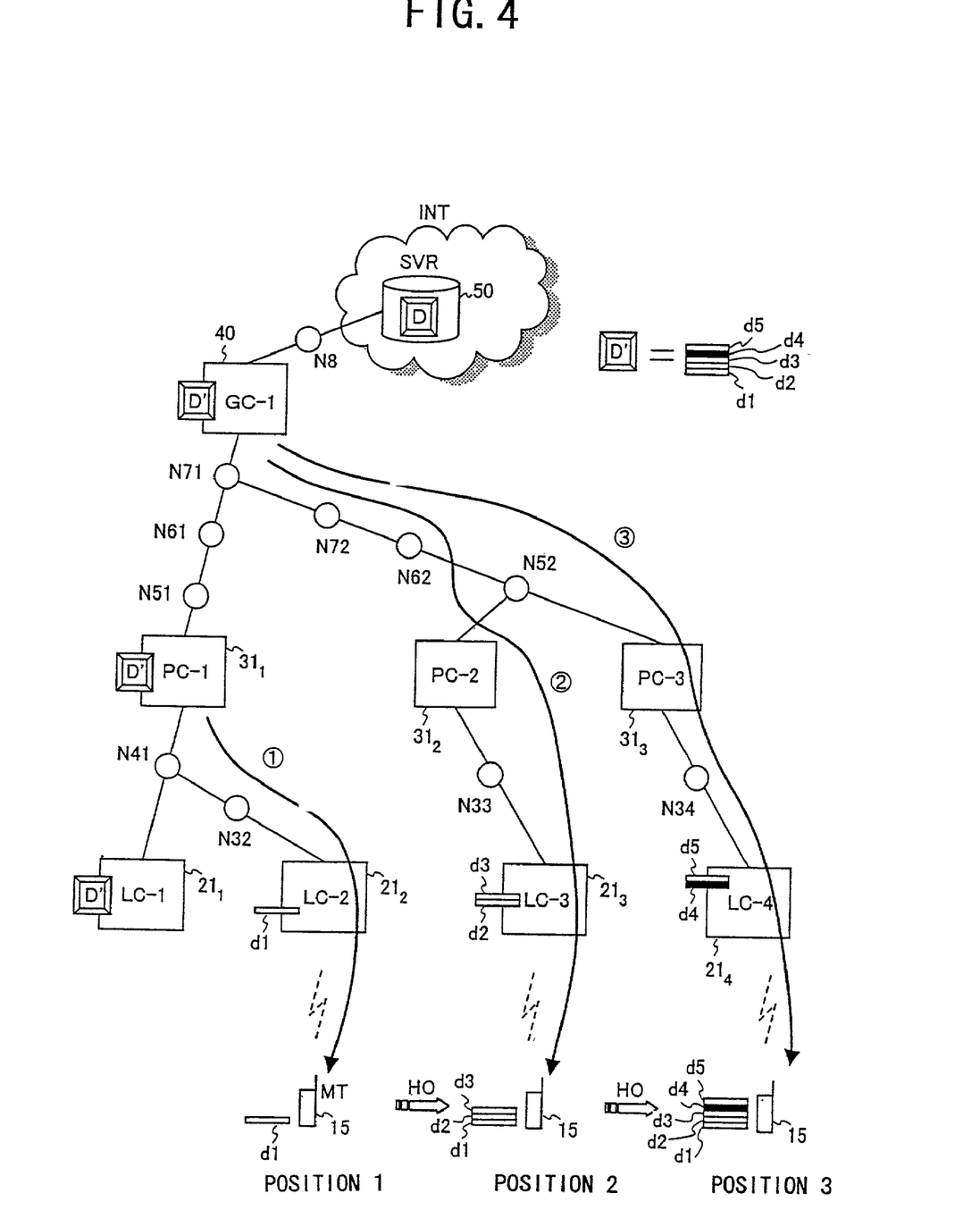
FIG. 4 is a schematic drawing showing a mobile communication system, relative to the embodiment of the present invention, in which information delivery channel is switched as a mobile terminal moves.

In the case that the mobile terminal 15 to which information is delivered through the mobile communication network where the information delivery is controlled in the manner described above moves in a wide range, as shown in FIG. 4, cache nodes serve the mobile terminal 15 by turns, as the mobile terminal 15 moves in the range, as a delivery source of the cache information. In FIG. 4, common components to FIG. 3 are referred to by the same numerals as in FIG. 3. The communication nodes connected to the local cache nodes $21_1$, $21_2$, $21_3$, $21_4$ and the wireless base stations under the local cache nodes are omitted.

While the mobile terminal 15 staying at a position 1 receives the cache information D' from the parent cache node $31_1$ through the communication nodes N41 and N32 and the local cache node $21_2$ (delivery channel ①), the local cache node $21_2$ stores the cache information D' (packets) serially. After receipt of a portion d1 of the cache information D', the mobile terminal 15 is assumed to move from the position 1 to a position 2. Since the grand parent cache node 40 starts serving, in accordance with the control method for information delivery described above, the mobile terminal 15 as a new delivery source of the cache information D' after the move of the mobile terminal 15, the parent cache node $31_1$ stops sending the cache information D' to the local cache node $21_2$. The local cache node $21_2$ registers the storage of the portion d1 of the cache information D' therein.

Figure 5A:
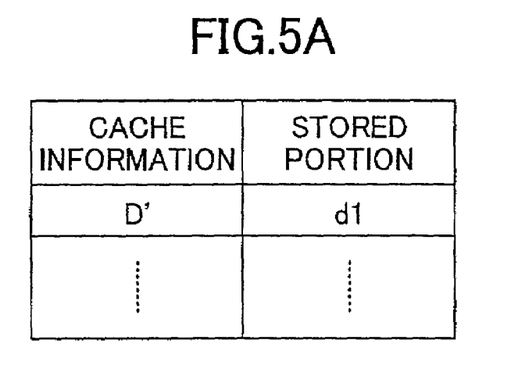
FIGS. 5A, 5B, and 5C are schematic drawings of a stored data table relative to an embodiment of the present invention.

The local cache node $21_2$ registers the storage using a stored data control table, shown in FIG. 5A for example, indicating information for identifying the cache information D' (its name, for example) and information for identifying the portion d1, such as sequential numbers of stored packets (SN1-SNn, for example).

As the mobile terminal 15 moves to the position 2, the grand parent cache node 40 starts delivering the remaining portion of the cache information D' as the new delivery source of the cache information D' in accordance with the procedure described above in reference with FIG. 3. Then, the remaining portion of the cache information D' is transferred to the mobile terminal 15 at the position 2 through communication nodes N71, N72, N62, and N52, the parent cache node 31$_2$, and the local cache node 21$_3$ (delivery channel ②). The parent cache node 31$_2$ and the local cache node 21$_3$ store the cache information D', portion by portion, as they transfer the cache information D'.

Furthermore, the mobile terminal 15 is assumed to move from the position 2 to a position 3 after it receives portions d2 and d3 of the cache information D'. Due to this move, a new delivery channel of the cache information from the grand parent cache node 40 through the parent cache node 31$_3$ and the local cache node 21$_4$ is established in accordance with the abovementioned control method for information delivery, and the parent cache node 31$_2$ and the local cache node 21$_3$ are disengaged from the delivery channel. Once the new delivery channel is established, the parent cache node 31$_2$ stops sending the cache information D' to the local cache node 21$_3$. The local cache node 21$_3$ registers therein the portions d2 and d3 of the cache information D' which have been stored.

Figure 5B:
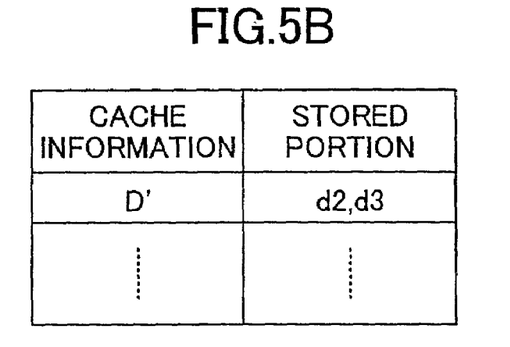

As shown in FIG. 5B, the local cache node 21$_3$ maintains a stored data control table indicating the relationship between the information to identify the cache information D' and the information (packet sequential numbers) to identify the stored portions d2 and d3 of the cache information D'.

The yet remaining portion of the cache information D' is transferred from the grand parent cache node 40 to the mobile terminal 15 through the newly established, as the mobile terminal 15 moves to the position 3, delivery channel including the parent cache node 31$_3$ and the local cache node 21$_4$ (delivery channel ③). The parent cache node 31$_3$ and the local cache node 21$_4$ transferring the cache information D' store the yet remaining portions of the cache information D' portion by portion.

Figure 5C:
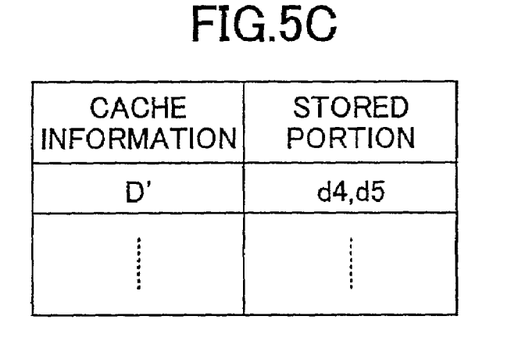

It is further assumed that the delivery of the cache information D' ends by the mobile terminal 15 receiving the portions d4 and d5 of the cache information D'. Accordingly the mobile terminal 15 obtains the cache data D' consisted of the portions d1, d2, d3, d4, and d5. The parent cache node 31$_3$ and the local cache node 21$_4$ receive no more portion of the cache information D' to be transferred because the portion d5 is the last portion. The parent cache node 31$_3$ and the local cache node 21$_4$ register therein the portions d4 and d5 of the cache information D' stored by the end of the transfer of the cache information D'. For example, the stored data control table registers the relationship of the information to identify the cache information D' and the information to identify the stored portion d4 and d5 (sequential numbers of packets) as shown in FIG. 5C.

As described above, as the mobile terminal 15 moves from the position 1 to the position 3, the delivery channel of the cache information D' is switched in the mobile communication network, and the portions of the cache information D' are stored by each cache node through which each portion of the cache data is transferred. Each cache node control the stored portions of the cache information D' utilizing the stored data control table shown in FIGS. 5A, 5B, and 5C.

If another mobile terminal at the position 2, for example, requests for the delivery of the information D after the end of the delivery of the cache information D' to the mobile terminal 15, the information D is transferred to the mobile terminal in the following manner.

It is assumed here that the mobile terminal 15 issued another delivery request for the information D for the ease of description. The delivery request for the information D is transferred through the communication nodes (including cache nodes) with establishing the delivery channel ②. During the process, the local cache node 21$_3$, in response to the receipt of the delivery request of the information D, checks whether it stores the cache information D' of the information D relative to the delivery request. In reference to the stored data control table (shown in FIG. 5B), the local cache node 21$_3$ determines that it stores the portions d2 and d3 of the cache information D', and it transfers the information with the delivery request from the mobile terminal 15 as cache node information. The parent cache node 31$_2$ transfers, as cache node information, the information indicating that the local cache node 21$_3$ stores the portions d2 and d3 of the cache information D'. The grand parent cache node 40 further transfers, as cache node information, the information indicating that it stores entire cache information D'.

The grand parent cache node 40 which stores entire cache information D' relative to the delivery request from the mobile terminal 15 at the position 2, based on the delivery request and the cache node information, assigns the local cache node 21$_3$ as the delivery source of the portions d2 and d3 of the cache information D', and further assigns itself, that is, the grand parent cache node 40, as the delivery source of the remaining portions d1, d4, and d5 of the cache information D'. Then, information indicating that the local cache node 21$_3$ is assigned as the delivery source of the portions d2 and d3 of the cache information D' is transferred from the grand parent cache node 40 to the local cache node 21$_3$ as a control signal. In response to the control signal, the local cache node 21$_3$ serially transfers the portions d2 and d3 of the cache information D' to the mobile terminal 15 at the position 2. Accordingly, the portions d2 and d3 of the cache information D' are transferred from the local cache node 21$_3$ to the mobile terminal 15 through each communication node in the delivery channel ②.

After the local cache node 21$_3$ finishes transferring the portions d2 and d3, the local cache node 21$_3$ informs the grand parent cache node 40 that the local cache node 21$_3$ finished transferring the portions d2 and d3. The grand parent cache node 40, in response to the information indicating the finish of delivery, delivers the remaining portions d1, d4, and d5 of the cache information D' to the mobile terminal 15 at the position 2 through the communication nodes N71, N72, N62, N52, the parent cache node 31$_2$, the communication node N33, and the local cache node 21$_3$ in the delivery channel ②.

As described above, the cache information D' consisted of the portions d1, d2, d3, d4, and d5 is delivered from each cache node in the mobile communication network to the mobile terminal 15. In the procedure described above, the portions of the cache information D' is delivered to the mobile terminal 15 in the order of d2, d3, d1, d4, and d5. The mobile terminal 15 arranges the portions in reference to a packet sequential number of each portion into the order d1, d2, d3, d4, and d5. Accordingly, the mobile terminal 15 obtains the requested information D by reproducing the cache information D' arranged in the order of d1, d2, d3, d4, and d5.

Because portions of the cache information D' stored in the cache nodes in the delivery channel ② is effectively used through the delivery control of the cache information D' described above, only the portions d1, d4, d5 are necessary to be transferred through the delivery channel between the grand parent cache node 40 and the local cache node $21_3$. It is only the delivery channel (including the wireless portion) between the local cache node $21_3$ and the mobile terminal 15 at the position 2 that all portions d1, d2, d3, d4, and d5 of the cache information D' are delivered through. Compared to the case in which all portions of the cache information D' from the grand cache node 40 to the mobile terminal 15 at the position 2, information traffic in the mobile communication network is effectively reduced.

In the case that, after the delivery of the cache information D' to the mobile terminal 15, another mobile terminal at the position 3 makes a delivery request for the information D, each portion of the cache information D' is delivered to the mobile terminal at the position 3 in the same manner as the portions are delivered to the mobile terminal at the position 2 as described above. That is, the portions d4 and d5 from the local cache node $21_4$, the remaining portions d1, d2, and d3 from the grand parent cache node 40 through the parent cache node $31_3$ and the local cache node $21_4$ are delivered to the mobile terminal 15 at the position 3. The mobile terminal 15 arranges the delivered portions of the cache information D' to reproduce the requested information D.

Accordingly, only portions d1, d2, and d3 of the cache information D' are delivered through the delivery channel between the grand cache node 40 and the local cache node $21_4$. It is only the delivery channel (including wireless portion) between the local cache node $21_4$ and the mobile terminal 15 at the position 3 that all portions of the cache information D' are necessary to be transferred through. Compared to the case in which all portions of the cache information D' are delivered from the grand parent cache node 40 to the mobile terminal at the position 3, the information traffic in the mobile communication network is reduced.

Figure 6:
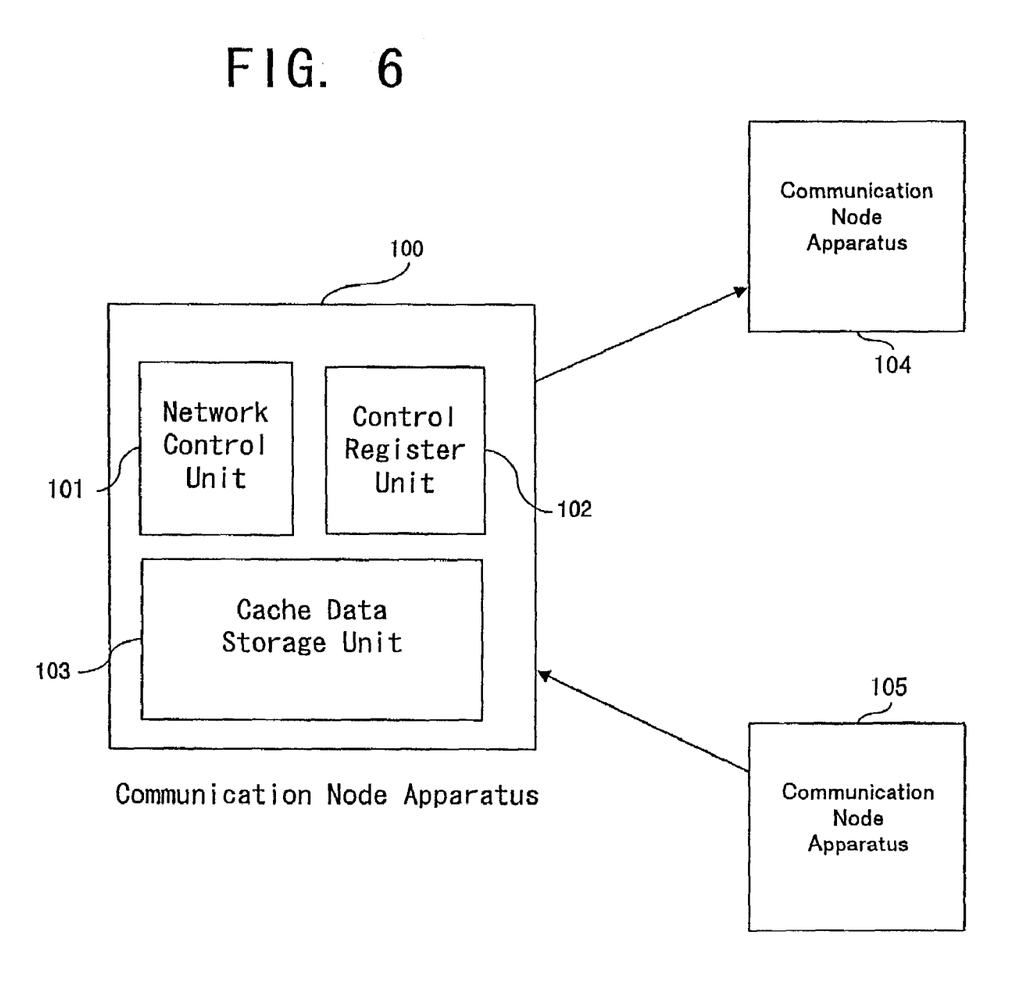
FIG. 6 is a block diagram of a communication node apparatus relative to an embodiment of the present invention.

FIG. 6 is a block diagram of a communication node apparatus 100 (including a cache node) relative to an embodiment of the present invention described above.

A communication node apparatus 100 which exchanges information with other communication node apparatuses 104 and 105 in a mobile communications network, includes a control register unit 102 which stores entry data therein. If the control register unit 102 stores the entry data therein, the communication node apparatus 100 is included in a delivery channel of information to the mobile terminal. The communication node apparatus further includes a network control unit 101 which, in response to a hand-over request from a mobile terminal, stores entry data of the mobile terminal in the control register unit 102 if the control register unit 102 does not store the entry data of the mobile terminal. Through this process, the communication node apparatus 100 joins the delivery channel of information to the mobile terminal.

The communication node apparatus 100 described above, wherein the network control unit 101, if the control register 102 stores the entry data of the mobile terminal therein, sends to one of the other communication node apparatuses, the communication node apparatus 105 for example, an instruction, in response to which the one of the network node apparatuses, that is, the communication node apparatus 105 in this example, deletes an entry data of the mobile terminal stored in a control register unit thereof.

A cache node can be configured as the communication node described above, further including a cache data storage unit 103 which stores cache data therein, wherein the network control unit 101, in response to a delivery request for information from the mobile terminal, if the cache data is identical to the requested information, sends to a communication node apparatus a first signal indicating that the cache data storage unit 103 stores the cache data therein, and the network control unit 101, in response to a second signal from one of the communication node apparatuses indicating that a portion of the information has been sent to the mobile terminal, sends a remaining portion of the cache data identical to the information stored in the cache data storage unit.

In summary, according to the present invention, when the delivery channel of the mobile terminal which receives the cache information from the first cache node through the first delivery channel is switched to the second delivery channel, because the second cache node in the second delivery channel continues the delivery of the cache information, the information transfer to a mobile terminal is performed in more efficient manner utilizing the cache function of the mobile communications network.

According to the present invention, in the process where the requested information is delivered to the mobile terminal, a portion of the information is stored in each communication node in the mobile communication network. Accordingly, if another mobile terminal requests for the same information, each communication node can deliver the portion of the information to the mobile terminal.

Furthermore, according to the present invention, a control method and system for information delivery in which information is delivered to a mobile terminal efficiently through a mobile communications network including each communication node storing a portion of the information are realized.

The preferred embodiments of the present invention are described above. The present invention is not limited to these embodiments, but various variations and modifications may be made without departing from the scope of the present invention.

This patent application is based on Japanese priority patent application No. 2001-006641 filed on Jan. 15, 2001, the entire contents of which are hereby incorporated by reference.

What is claimed is:

1. An information storage method for a mobile communications network in which a mobile terminal receives information through a plurality of delivery channels, wherein in response to a delivery channel through which the information is delivered to the mobile terminal being switched to another as the mobile terminal moves from a communication area to another, a communication node in a delivery channel through which the information has been delivered to the mobile terminal registers a portion of the information which has been stored therein;

wherein, if there is a first cache node in which a portion of the information is registered in a delivery channel which is established in response to an information delivery request from a mobile terminal, the first cache node delivers the portion of the cache information to the mobile terminal; and wherein, if a second communication node is included in the delivery channel established in response to an information delivery request, the first communication node informs the second communication node that the first cache node has delivered a portion of the information, and the second communication node delivers a remaining portion of the information except for the portion which has been delivered by the first cache node to the mobile terminal through the delivery channel.

2. An information storage method for a mobile communications network in which a mobile terminal receives information through a plurality of delivery channels, wherein in response to a delivery channel through which the information is delivered to the mobile terminal being switched to another as the mobile terminal moves from a communication area to another, a communication node in a delivery channel through which the information has been delivered to the mobile terminal registers a portion of the information which has been stored therein;

wherein a second cache node storing a portion of the requested information exists in the delivery channel established in response to the information delivery request, the first cache node informs the second cache node that the first cache node has delivered the portion of the requested information; and the second cache node delivers, through the delivery channel established-in response to the information delivery request, the remaining portion of the information except for the portion of the cache information which is delivered from the first cache node to the mobile terminal.

3. A method of delivering information to a mobile terminal through a mobile communication network including a plurality of communication nodes, the method comprising the steps of:

identifying a first cache node caching the information in a first delivery channel established based on a delivery request for the information from the mobile terminal;

identifying a second cache node caching the information in a second delivery channel established as the mobile terminal moves;

sending delivery information from the first cache node to the second cache node, the delivery information indicating a portion of the information that has been delivered to the mobile terminal by the first cache node; and delivering a remaining portion of the information from the second cache node in response to receipt of the delivery information.

4. The method as claimed in claim 3, wherein in the step of sending delivery information, a communication node located in the first delivery channel and the second delivery channel acquires the delivery information from the first cache node and transfers the acquired delivery information to the second cache node.

5. The method as claimed in claim 3, wherein when the mobile terminal receiving the information through the first delivery channel is handed over from a first wireless communication node to a second wireless communication node, the second delivery channel including the second wireless communication node is established and the second cache node in the second delivery channel is identified.

6. A mobile communication network, comprising:

a mobile terminal;

a server that stores information; and a plurality of cache nodes that caches at least a portion of the information stored in the server, wherein a first one of the cache nodes in a first delivery channel established based on a delivery request from the mobile terminal for the information stored in the server sends delivery information to a second one of the cache nodes in a second delivery channel established as the mobile terminal moves, the delivery information indicating a portion of the information that has been delivered to the mobile terminal by the first one of the cache nodes, and the second one of the cache nodes delivers a remaining portion of the information in response to receipt of the delivery information from the first one of the cache nodes.

7. The mobile communication network as claimed in claim 6, further comprising:

a plurality of communication nodes, wherein a communication node located at a diverging point of the first delivery channel and the second delivery channel acquires the delivery information from the first one of the cache nodes via the first delivery channel and transfers the acquired delivery information to the second one of the cache nodes via the second delivery channel.

8. The mobile communication network as claimed in claim 6, further comprising:

a plurality of wireless communication nodes that wirelessly communicates with the mobile terminal, wherein when the mobile terminal receiving the information through the first delivery channel is handed over from a first one of the wireless communication nodes to a second one of the wireless communication nodes, the second delivery channel is formed and the second one of the cache nodes is identified.

* * * * *